United States Patent
Matsuda (10) Patent No.: US 8,830,376 B2
(45) Date of Patent: Sep. 9, 2014

(54) MOBILE TERMINAL AND CAMERA MODULE CONTROLLING METHOD

(75) Inventor: Munehito Matsuda, Daito (JP)

(73) Assignee: KYOCERA Corporation, Kyoto (JP)

( * ) Notice: Subject to any disclaimer, the term of this patent is extended or adjusted under 35 U.S.C. 154(b) by 266 days.

(21) Appl. No.: 13/092,076

(22) Filed: Apr. 21, 2011

(65) Prior Publication Data

US 2011/0261248 A1    Oct. 27, 2011

(30) Foreign Application Priority Data

Apr. 26, 2010 (JP) ................................. 2010-100603

(51) Int. Cl.
    H04N 5/225    (2006.01)
(52) U.S. Cl.
    USPC .......................................... 348/340; 348/345
(58) Field of Classification Search
    None
    See application file for complete search history.

(56) References Cited

U.S. PATENT DOCUMENTS 7,593,054 B2 *  9/2009  Toyomura ...................... 348/349

FOREIGN PATENT DOCUMENTS

| JP | H07-043589 A | 2/1995 |
| JP | 2002-135636 A | 10/2002 |
| JP | 2004-054109 A | 2/2004 |
| JP | 2006-030393 A | 2/2006 |
| JP | 2007-333858 A | 12/2007 |

OTHER PUBLICATIONS

Office Action dated Dec. 10, 2013, issued in counterpart Japanese Application No. 2010-100603.
Office Action dated Mar. 18, 2014, issued in counterpart Japanese Application No. 2010-100603.

* cited by examiner

*Primary Examiner* — Twyler Haskins
*Assistant Examiner* — Angel L Garces-Rivera
(74) *Attorney, Agent, or Firm* — Procopio, Cory, Hargreaves & Savitch (57) ABSTRACT

A mobile phone apparatus has a camera module which increases in temperature by a focusing operation. A processor acquires a correlation coefficient of a lens position including a numerical value of a focal length as a numerical value correlating with a lens position of a focus lens. Furthermore, the processor converts the focal length into an object distance, and starts to count a time when the object distance is equal to or less than a threshold value. Then, the processor suspends the focusing operation by a camera module when the counted time reaches a time-out period.

9 Claims, 8 Drawing Sheets

| TIMER TABLE | |
|---|---|
| OBJECT DISTANCE | TIMER VALUE |
| 10 cm | 60 SEC |
| 11 – 20 cm | 90 SEC |
| 21 – 50 cm | 180 SEC |
| 51 – 100 cm | 360 SEC |
| 101 cm OR MORE | NONE |

TIMER TABLE

| OBJECT DISTANCE | TIMER VALUE |
|---|---|
| 10 cm | 60 SEC |
| 11 – 20 cm | 90 SEC |
| 21 – 50 cm | 180 SEC |
| 51 – 100 cm | 360 SEC |
| 101 cm OR MORE | NONE |

MOBILE TERMINAL AND CAMERA MODULE CONTROLLING METHOD

CROSS REFERENCE OF RELATED APPLICATION

The Present application claims priority under 35 U.S.C. §119 to Japanese Patent Application No. 2010-100603, filed on Apr. 26, 2010, entitled mobile terminal, camera module control program and camera module controlling method, which is incorporated herein by reference in its entirety.

BACKGROUND OF THE INVENTION

1. Field of the Invention

The present invention relates to a mobile terminal and a camera module controlling method. More specifically, the present relates to a mobile terminal having a camera module capable of executing a lens adjusting operation.

2. Description of the Related Art

An example of this kind of a related art is disclosed in a Japanese Patent Application Laid-Open No. 2002-135636 [H04N 5/225, G03B 19/02, H04N 5/232, G03B 17/55] laid-open on May 10, 2002. An electronic camera of this related art includes an optical system for imaging being made up of a plurality of lenses, CCD, etc., a lens driving circuit performing a focus adjusting operation (AF operation) of the optical system for imaging, a temperature sensor for detecting a temperature inside the camera. In a case that the temperature sensor detects a temperature equal to or more than a predetermined temperature, supplying electric power to the lens driving circuit is suspended to stop the AF operation itself.

Recently, camera modules being made up of an optical system for imaging, a lens driving circuit, etc. have been developed, and are often integrated in mobile terminals like a mobile phone apparatus, etc. Furthermore, recent mobile terminals have become smaller and thinner, and therefore, the camera modules integrated in the mobile terminals have also become smaller.

However, miniaturization is given preference to the development of the camera modules, so that the camera modules having temperature sensors have scarcely been developed. Thus, the temperature of the camera module integrated in the mobile terminal is never measured by a temperature sensor, or the like. That is, in recent mobile terminals, a measure like the related art has seldom been taken.

SUMMARY OF THE INVENTION

Therefore, it is a primary object of the present invention to provide a novel mobile terminal and a camera module controlling method.

Another object of the present invention is to provide a mobile terminal and a camera module controlling method capable of taking a measure against temperature with respect to the camera module.

The present invention employs following features in order to solve the above-described problems. It should be noted that reference numerals inside the parentheses and the supplementary explanations show one example of a corresponding relationship with the embodiments described later for easy understanding of the present invention, and do not limit the present invention.

A first invention is a mobile terminal having a camera module integrated with a lens, the camera module executing a lens adjusting operation by adjusting a lens position of the lens, comprising: an acquirer which acquires lens position data including a numerical value as to the lens position from the camera module; a timer counter which starts to count a time when the lens position data falls within a predetermined range; and a lens adjustment suspender which suspends the lens adjusting operation by the camera module when the time counted by the time counter reaches a predetermined time.

In the first invention, the mobile terminal (10: reference numeral designating a corresponding portion in the embodiments. The same is true for the following description.) has a camera module (36) integrated with a lens (40). Furthermore, the camera module executes a lens adjusting operation by operating a lens position of the lens. The numerical value of the lens position is a numerical value of a distance between the lens and the sensor, and an acquirer (24, S11) acquires the numerical value based on the distance as lens position data. For example, a time counter (24, S35, S37) starts to count a time when the numerical value as to the lens position falls within a predetermined range. A lens adjustment suspender (24, S45) suspends a lens adjusting operation by the camera module when a predetermined time (time-out period) has elapsed from when the time counter determines that the numerical value as to the lens position falls within a predetermined range, for example.

According to the first invention, the camera module increases in temperature by the lens adjusting operation. Thus, by suspending the lens adjusting operation based on the operating time, it is possible to take a measure against the temperature with respect to the camera module.

A second invention is according to the first invention, wherein the lens position data is divided into a plurality of sections depending on a magnitude thereof, and the predetermined time is different for each section.

A third invention is according to the second invention, further comprising: a storage which stores a table in which a numerical value included in the lens position data corresponding to the section is brought into correspondence with the predetermined time being different from one section to another; and a setter which sets the predetermined time based on the table stored in the storage when the lens position data is acquired by the acquirer.

In the third invention, a storage (34) is a storage medium such as a RAM, for example, and stores a table in which a numerical value included in the lens position data corresponding to the section is brought into correspondence with the predetermined time being different from one section to another. A setter (24, S31) sets the predetermined time based on the table when the lens position data is acquired by the acquirer.

According to the second invention and the third invention, the predetermined time can be set depending on the object distance, and therefore, it is possible prevent the user from encountering a situation in which the lens adjusting operation is suspended as much as possible.

A fourth invention is according to the first invention, wherein the camera module includes a motor (44, 46), and the lens position of the lens changes depending on the motor.

According to the fourth invention, if the camera module has a motor being a source of generation, the aforementioned effect can especially be exerted.

A fifth invention is according to the first invention, wherein the lens includes a focus lens, and the lens adjusting operation includes a focusing operation.

A sixth invention is a camera module controlling method of a mobile terminal (10) having a camera module (36) integrated with a lens (40), the camera module executing a lens adjusting operation by adjusting a lens position of the lens, comprising steps of: acquiring lens position data including a numerical value as to the lens position from the camera module (S11); starting to count a time when the lens position data falls within a predetermined range (S35,S37); and suspending the lens adjusting operation by the camera module when the counted time reaches a predetermined time (S45).

According to the sixth invention, similar to the first invention, the camera module increases in temperature by the lens adjusting operation. Thus, by suspending the lens adjusting operation based on the operating time, it is possible to take a measure against the temperature with respect to the camera module.

DETAILED DESCRIPTION OF THE PREFERRED EMBODIMENTS

Figure 1:
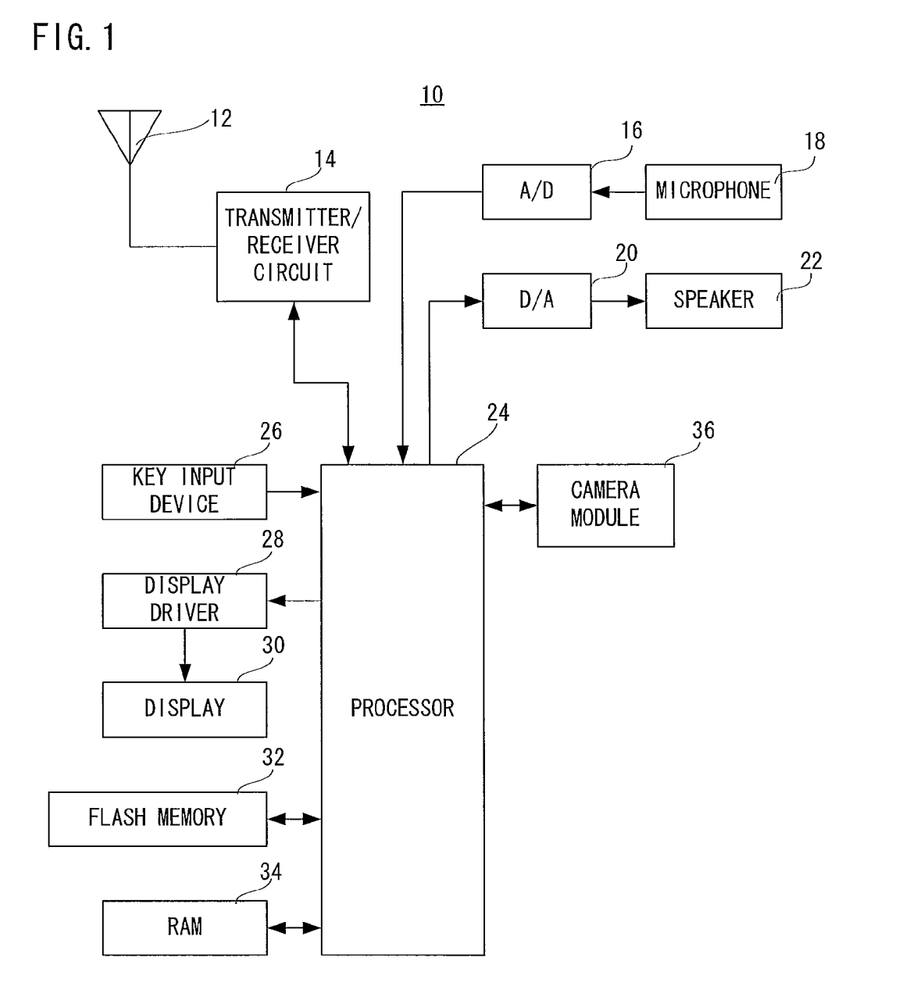
FIG. 1 is a block diagram showing an electric configuration of a mobile phone apparatus of one embodiment of this invention.

Referring to FIG. 1, a mobile phone apparatus 10 of this embodiment is one kind of the mobile terminal, and includes a processor 24 called a CPU or a computer. The processor 24 is connected with a transmitter/receiver circuit 14, an A/D 16, a D/A 20, a key input device 26, a display driver 28, a flash memory 32, a RAM 34 and a camera module 36. Furthermore, the transmitter/receiver circuit 14 is connected with an antenna 12, the A/D 16 is connected with a microphone 18, and the D/A 20 is connected with a speaker 22 via an amplifier (not shown). Furthermore, the display driver 28 is connected with a display 30.

The processor 24 overall controls the mobile phone apparatus 10. The RAM 34 being a storage is utilized as a task area (including a depicting area) or a buffer area of the processor 24. The flash memory 32 is recorded with data of contents, such as characters, images, voices, sounds, videos of the mobile phone apparatus 10, etc.

The A/D 16 converts an analog voice signal as to a voice or a sound input through the microphone 18 connected to the A/D 16 into a digital voice signal. The D/A 20 converts (decodes) a digital voice signal to an analog voice signal, and applies the converted one to the speaker 22 via the amplifier. Accordingly, a voice or a sound corresponding to the analogue voice signal is output from the speaker 22.

The key input device 26 being an inputter has a talk key, an on-hook key, etc., and has a dial key 26h including "0" to "9" keys, a "*" key and a "#" key. Then, key information (key data) the user operates is input to the processor 24.

Here, when each key included in the key input device 26 is operated, feedback processing is executed to thereby output a feedback sound from a speaker not shown. Thus, the user can achieve an operational feeling against the key input operation by hearing the feedback sound.

The display driver 28 controls a display of the display 30 connected to the display driver 28 under the instruction of the processor 24. Here, the display driver 28 includes a video memory (not illustrated) for temporarily storing image data to be displayed.

The transmitter/receiver circuit 14 is a circuit for performing wireless communication in a CDMA system. For example, when the user instructs the transmitter/receiver circuit 14 to transmit a voice transmission by utilizing the key input device 26, the transmitter/receiver circuit 14 executes voice transmitting processing under the instruction of the processor 24 and outputs a voice transmitting signal via the antenna 12. The voice transmitting signal is transmitted to a telephone apparatus of a communication partner through base stations and a communication network (not illustrated). Then, when incoming call processing is performed in the telephone apparatus of the communication partner, a connection state (communication allowable state) is established, and the processor 24 executes speech communication processing.

Describing normal speech communication processing in detail, a modulated voice signal (high frequency signal) transmitted from the telephone apparatus of the communication partner is received by the antenna 12. The received modulated voice signal undergoes demodulation processing and decoding processing by the transmitter/receiver circuit 14. The received voice signal acquired by such the processing is converted in to an analog voice signal by the D/A 20, and then, the converted analog signal is output from the speaker 22. On the other hand, a voice signal to be transmitted captured through the microphone 18 is converted into a digital voice signal by the A/D 16, and then, the converted digital voice signal is applied to the processor 24. The signal to be transmitted which is converted into digital voice signal undergoes coding processing and modulation processing by the transmitter/receiver circuit 14 under the control of the processor 24, and the resultant is output via the antenna 12. Accordingly, the modulated voice signal is transmitted to the telephone apparatus of the communication partner via the base stations and the communication network.

Furthermore, when a transmitting signal from the telephone apparatus of the communication partner is received by the antenna 12, the transmitter/receiver circuit 14 notifies the processor 24 of a voice incoming (also referred to as "call in"). In response thereto, the processor 24 controls the display driver 28 to display calling source information (phone number) described in the incoming call notification on the display 30. At approximately the same time, the processor 24 outputs an incoming call tone (or, incoming call melody, incoming call sound) from a speaker (not illustrated). Furthermore, the processor 24 flashes an LED not shown and vibrates the mobile phone apparatus 10 by driving (rotating) a motor not shown.

When the user performs a response operation by utilizing the talk key, the transmitter/receiver circuit 14 executes voice incoming call processing to establish a connected state (communication allowable state) under the control of the processor 24, and then, the processor 24 executes the above-described normal speech communication processing.

Furthermore, when a speech communication end operation is performed by an on-hook key after the transition to the connected state, the processor 24 controls the transmitter/receiver circuit 14 to transmit a speech communication end signal to the communication partner. After transmission of the speech communication end signal, the processor 24 ends the speech communication processing. In a case that a speech communication end signal is received from the communication partner as well, the processor 24 ends the speech communication processing. In addition, in a case that a speech communication end signal is received not from the communication partner but from the mobile communication network as well, the processor 24 ends the speech communication processing.

Figure 2:
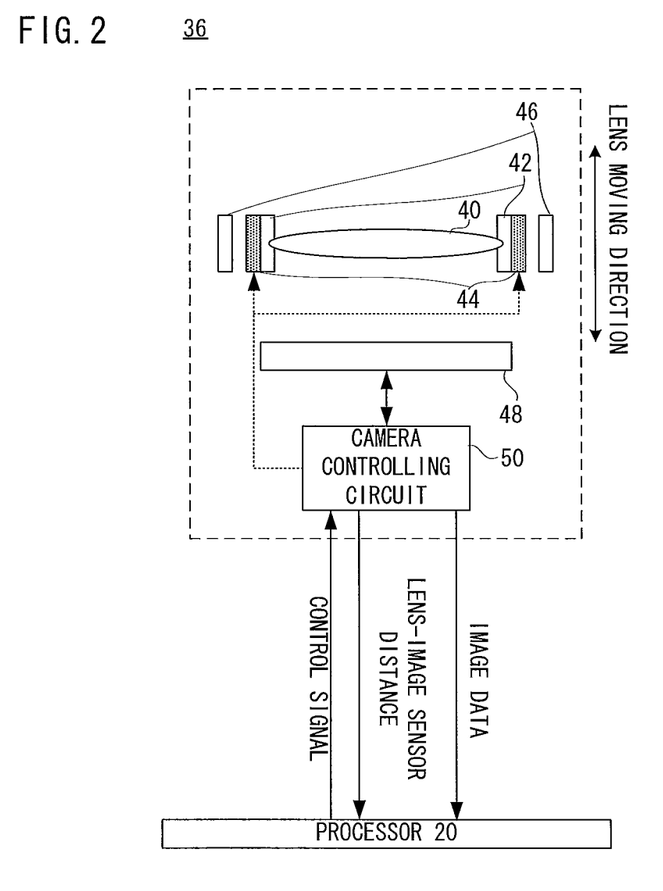
FIG. 2 is an illustrative view showing one example of a configuration of a camera module shown in FIG. 1.

Furthermore, the mobile phone apparatus 10 can execute a camera function utilizing the camera module. With reference to FIG. 2, the camera module 36 is made up of a focus lens 40, a lens barrel 42, a coil 44, a magnet 46, an image sensor 48 and a camera controlling circuit 50.

The focus lens 40 is supported by the cylindrical lens barrel 42, and the coil 44 is wound around the outer periphery of the lens barrel 42. Furthermore, at the perimeter of the coil 44, the magnet 46 is arranged. Then, the camera controlling circuit 50 can move the lens barrel 42 supporting the focus lens 40 to an optical axis direction (lens moving direction) by carrying a current through the coil 44 according to the principle of a so-called linear motor. Thus, the coil 44 and the magnet 46 may collectively be called a voice coil motor.

In addition, the lens barrel 42 is supported by a spring not shown so as to be the closest to the image sensor 48 at the initial position. Thus, the initial position of the focus lens 40 is also the closest to the image sensor 48.

It should be noted that the illustration of a casing included in the camera module 36 is omitted for simplicity in FIG. 2. Furthermore, a glass sheet functioning as an IR (InfraRed) cut filter may also be provided between the focus lens 40 and the image sensor 48. Also, a lens adjusting operation with respect to the focus lens 40 can also be referred to as a focusing operation.

Here, an optical image of an object scene is irradiated onto the image sensor 48 through the focus lens 40. In an imaging area of the image sensor 48, photoreceptors corresponding to SXGA (1280×1024 pixels), for example, are arranged, and in the imaging area, electric charges corresponding to the optical image of the object scene, that is, a raw image signal of SXGA is generated by photoelectronic conversion. Furthermore, the imaging area of the image sensor 48 is covered with a color filter of a primary color Bayer array (not shown). Thus, an electric charge generated in each photoreceptor arranged in the imaging area has color information of red, green, or blue. It should be noted that the user can change the size of image data to XGA (1024×768 pixels), 640×240 size, etc. other than the SXGA.

When an input operation for executing the camera function is performed on the key input device 26, the processor 24 outputs a control signal to the camera controlling circuit 50 included in the camera module 36 in order to display a real-time motion image of the object scene, that is, a through-image on the display 30. The camera controlling circuit 50 activates an image sensor driver (not shown) in response to the input control signal.

The image sensor driver executes exposure of an imaging surface of the image sensor 48, and reading of the electric charges generated by the exposure. Consequently, the raw image signal is output from the image sensor 48. The output raw image signal is input to the camera controlling circuit 50, and the camera controlling circuit 50 performs processing, such as a color separation, a white balance adjustment, a YUV conversion, etc. on the input raw image signal to thereby generate image data in a YUV format. Then, the image data in a YUV format is input to the processor 24.

Furthermore, the camera controlling circuit 50 performs general AF processing on the input raw image signal to thereby calculate an AF evaluation value. Then, the camera controlling circuit 50 controls the voice coil motor on the basis of the calculated AF evaluation value. That is, the camera controlling circuit 50 adjusts a lens position of the focus lens 40 and brings the object scene into focus on the basis of the AF evaluation value calculated from the raw image signal. Then, the camera controlling circuit 50 outputs a numerical value of a distance correlating with the lens position to the processor 24.

Furthermore, the processor 24 temporarily stores the input image data in a YUV format in a buffer of the RAM 34, and stores a numerical value of the distance between the lens and the image sensor as lens position data in the buffer.

The image data in a YUV format stored in the buffer is applied from the RAM 34 to the display driver 28 via the processor 24. At the same time, the processor 24 issues a thinning-out reading instruction to the display driver 28. Then, the display driver 28 outputs the image data in a YUV format to the display 30 in response to the thinning-out reading instruction issued from the processor 24. This makes it possible to a through-image of a low resolution representing the object scene (320×240 pixels, for example) on the display 30.

Here, in the image data in a YUV format, Y means luminance, U means a color difference between blue and the luminance, and V means a color difference between red and the luminance. That is, the image data in a YUV format is made up of luminance signal (Y) data, blue color-difference signal (U) data, and red color-difference signal (V) data.

Here, when an imaging operation is performed by the key input device 26, the processor 24 executes main imaging processing. That is, the processor 24 performs signal processing on the raw image signal of SXGA output from the image sensor 48, temporarily stores the same in the RAM 34, and performs recording processing thereof in the flash memory 32. When the recording processing is executed, the image data is read from the RAM 34 through the processor 24. Then, the processor 24 records as an image file including the read image data in the flash memory 32. In addition, the processor 24 outputs a sound notifying that main imaging processing is executed from the speaker not shown. Here, in a case that a memory card is connected to the mobile phone apparatus 10, the image file may be stored in the memory card.

Figure 3:
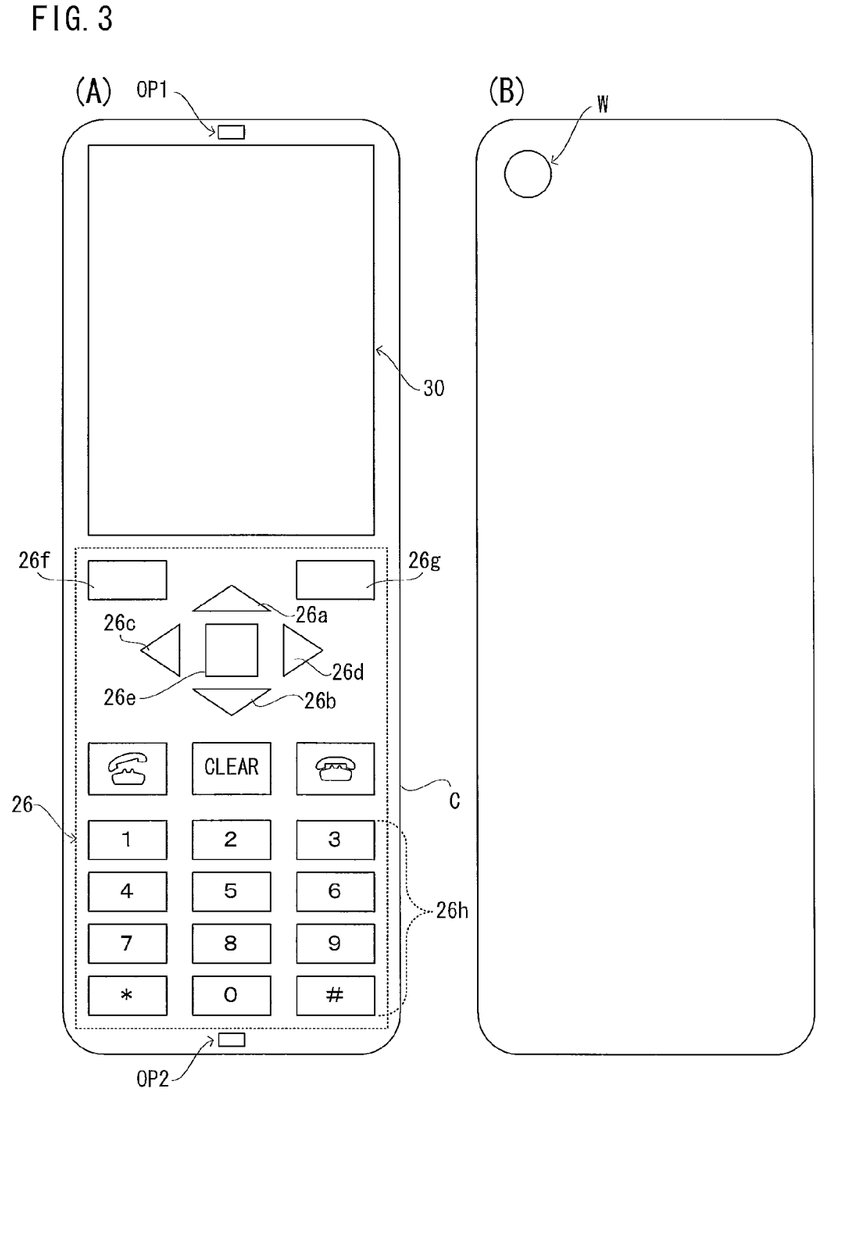
FIG. 3 is an illustrative view showing an appearance of the mobile phone apparatus shown in FIG. 1.

FIG. 3(A) and FIG. 3(B) each is an external view of the mobile phone apparatus 10. Referring to FIG. 3(A) and FIG. 3(B), the mobile phone apparatus 10 has a straight shape, and has a planar rectangular case C. The microphone 18 not shown is contained in the case C, and an opening OP2 communicating with the contained microphone 18 is provided at one end of the longitudinal direction of the case C on one main surface. Similarly, the speaker 22 not shown is contained in the case C, and an opening OP1 communicating with the contained speaker 22 is provided at the other end of the longitudinal direction of the case C on the one main surface. Then, the display 30 is attached such that the monitor screen is exposed from the one main surface of the case C.

Various keys belonging to the key input device 26 include an upward key 26a, a downward key 26b, a leftward key 26c and a rightward key 26d other than the dial key 26h. In addition, the key input device 26 has a decision key 26e, a first function key 26f, a second function key 26g, etc., and the respective keys are provided on the one main surface of the case C.

Here, the upward key 26a, the downward key 26b, the leftward key 26c and the rightward key 26d may collectively be called a cursor key. Furthermore, the talk key and the on-hook key belonging to the key input device 26 are also provided to the one main surface of the case C.

For example, while confirming the display 30, the user inputs a phone number by operating the dial key 26h, and performs a voice transmitting operation by the talk key, and performs a speech communication end operation by the on-hook key. Furthermore, the user performs a selection and a decision of the menus of the GUI by operating the cursor key and the decision key 26e. In addition, the user can execute a mail function, an address book function and a blog function by operating the decision key 26e, the first function key 26f or the second function key 26g. Then, the user turns on/off the power of the mobile phone apparatus 10 by long-pushing the on-hook key.

Furthermore, on the other main surface of the case C in a longitudinal direction, a window W communicating the camera module 36 not shown is provided, and a plastic capable of transmitting visible light is fit into the window W. Accordingly, the user can image the object by directing the other surface of the case C to an arbitrary object.

Here, the antenna 12, the transmitter/receiver circuit 14, the A/D 16, the D/A 20, the processor 24, the display driver 28, the flash memory 32, the RAM 34 and the camera module 36 are contained in the case C, and not illustrated in FIG. 3(A) and FIG. 3(B).

Figure 4:
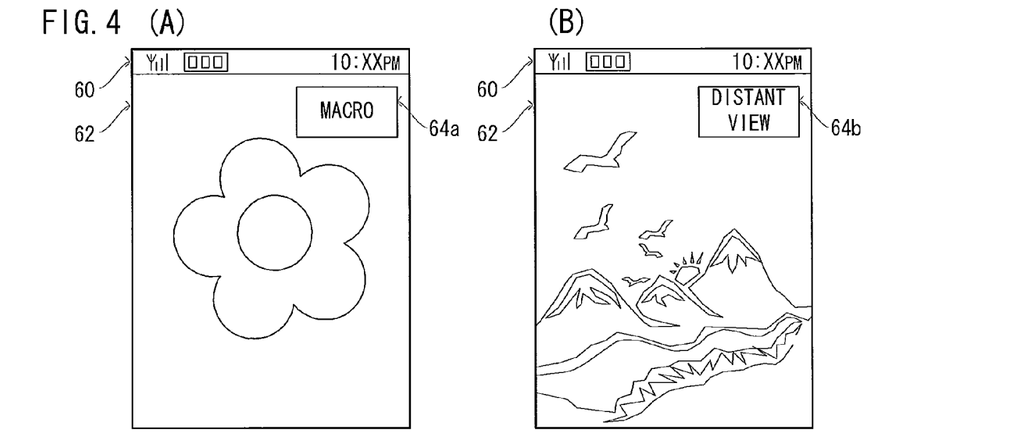
FIG. 4 is an illustrative view showing a state in which a GUI of a camera function is displayed on a display shown in FIG. 1.

FIG. 4(A) and FIG. 4(B) each is an illustrative view showing one example of the GUI of a manual focus (MF) in the camera function. Referring to FIG. 4(A), the display area of the display 30 is made up of a state displaying area 60 and a function displaying area 62. In the state displaying area 60, icons (referred to as a "PICT") representing an electromagnetic wave receiving state by the antenna 12 and a remaining amount of the battery of the secondary battery, and a current date and time are displayed. Here, the current time is based on time information output from the RTC not shown.

Furthermore, in the function displaying area 62, a through-image of the object scene imaged by the camera module is displayed, and an icon 64a representing a macro mode of the manual focus are displayed. Furthermore, in the macro mode, the lens position of the focus lens 40 is adjusted so as to be the farthest state from the image sensor 48. Thus, the spring supporting the lens barrel 42 is compressed to thereby increase a current flowing though the coil 44.

In addition, referring to FIG. 4(B), in the function displaying area 62, in place of the icon 64a representing the macro mode, an icon 64b representing a distant view mode of the manual focus is displayed. For example, the user can switch between the macro mode and the distant view mode by operating the "*" key of the key input device 26. Here, in the distant view mode, the lens position of the focus lens 40 is adjusted to approximately the initial position, and thus, the current flowing through the coil 44 is smaller than that in the macro mode.

Figure 5:
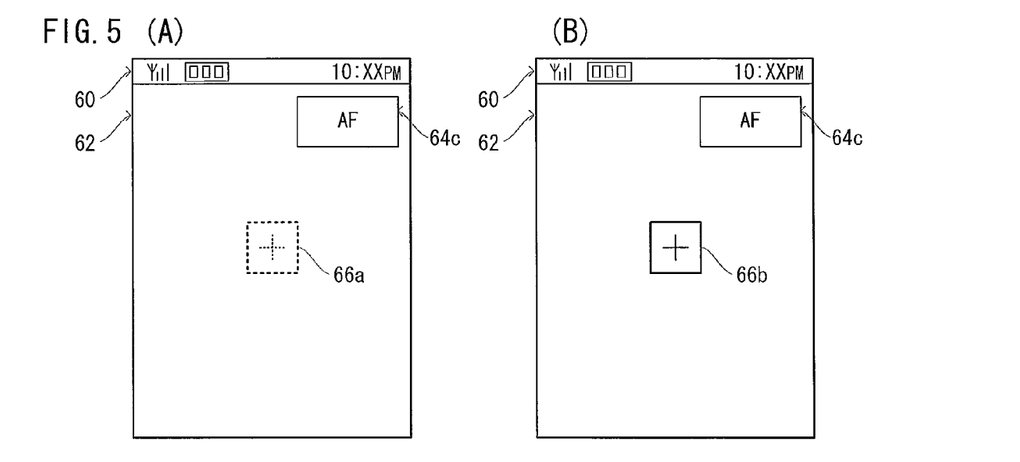
FIG. 5 is an illustrative view showing a state in which another GUI of the camera function is displayed on the display shown in FIG. 1.

FIG. 5(A) and FIG. 5(B) each is an illustrative view showing one example of a GUI of an autofocus (AF). Referring to FIG. 5(A), in the function displaying area 62, an icon 64c representing the autofocus mode is displayed. Furthermore, at the center of the function displaying area 62, a guide 66a is depicted by dotted line. The guide 66a indicates a position where image data to be imaged is in focus in the autofocus processing. Additionally, the autofocus processing is executed immediately before the imaging processing after an imaging operation is performed. Thus, until the autofocus processing is executed, the lens position of the focus lens 40 is set to the initial position. That is, in this state, a less current flows through the coil 44. Here, the user can switch between the manual focus and the autofocus by operating the "#" key in the key input device 26.

Furthermore, referring to FIG. 5(B), at the center of the function displaying area 62, a guide 66b is depicted not by the dotted line but by the solid line. In addition, the depiction of the guide 66b in place of the guide 66a means a focus locking state. In the focus locking state, the position of the focus lens 40 is maintained, keeping in focus by the autofocus processing. Thus, in the focus locking state, a current continues to flow through the coil 44. It should be noted that the user can set the focus locking state by operating the "*" key with the icon 64c displayed.

Here, when the current continues to flow through the coil 44 within the camera module 36, the coil 44 generates heat. Thus, the camera module 36 heats up inside and around it, and this affects the optical axis of the focus lens 40 and components around the camera module 36. Thereupon, in this embodiment, by restricting a time during which current flows through the coil 44 based on a time-out period (predetermined time), the heat generation of the coil 44 is suppressed.

Furthermore, when a time during which a current flows through the coil 44 is longer than the time-out period, the focusing operation is suspended irrespective of the operation state of the user, and the lens position of the focus lens 40 is returned to the initial position. For example, when the camera controlling circuit 50 stops flowing a current through the coil 44, the focus lens 40 is returned to the initial position by the spring which supports the lens barrel 42.

For example, the relation between the distance between the lens and the image sensor and the distance from the lens to the object (object distance) is as shown in a following equation 1. Here, X indicates the distance from the object surface to a principal point of the lens 40, Y indicates a distance from the principal point to the imaging surface (image sensor 48), and F is a focal length $$1/X + 1/Y = 1/F \qquad \text{[Equation 1]}$$

The distance between the lens and the image sensor and the object distance has a proportional relation. That is, the shorter the object distance is, the longer the distance between the lens and the image sensor is, and the longer the object distance is, the shorter the distance between the lens and the image sensor is. Thus, in the macro mode, the lens-image sensor distance between the focus lens 40 and the image sensor 48 is the longest, and the object distance becomes shorter. Then, in this state, the current flowing through the coil 44 increases, so that the coil 44 generates heat. That is, if the macro mode is set for a long time, the camera module 36 increases in temperature.

Here, in this embodiment, the lens-image sensor distance and the object distance are in a proportional relation, and therefore, the object distance is calculated on the basis of the lens-image sensor distance output from the camera module 36.

Figure 6:
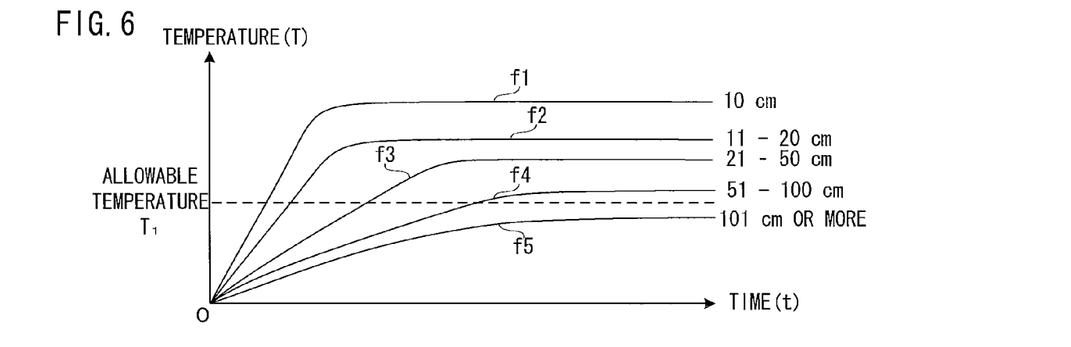
FIG. 6 is a graph representing a temperature change of the camera module while a current flows through a coil shown in FIG. 2.

FIG. 6 is a graph showing a relation between a time during which a current is carried through the coil 44 and the temperature of the camera module 36. Referring to FIG. 6, in the graph, curves f1-f5 are included, and the curves f1-f5 correspond to object distances. The curve f1 corresponds to an object distance of "10 cm", the curve f2 corresponds to an object distance of "11 to 20 cm", the curve f3 corresponds to an object distance of "21 to 50 cm", the curve f4 corresponds to an object distance of "51 to 100 cm", and the curve f5 corresponds to an object distance of "101 cm or more". Furthermore, these curves f1-f5 significantly changes like a logarithm function graph at first, but scarcely changes thereafter. That is, the temperature of the camera module 36 significantly increases for a constant time from the start of carrying a current.

Furthermore, in a case that a limit temperature in which the camera module 36 is sure to properly work is an allowable temperature T1, the allowable temperature T1 can be represented by the dotted line in this graph. Then, the temperature of the camera module 36 is different in when it exceeds the allowable temperature T1 depending on the length of the object distance. Furthermore, it is found that as to some object distances, the temperature of the camera module 36 does not exceed the allowable temperature T1. That is, the object distance is divided into a plurality of sections, and by deciding a timer value for each section (time-out period), the time-out period can be set based on the object distance.

Figure 7:
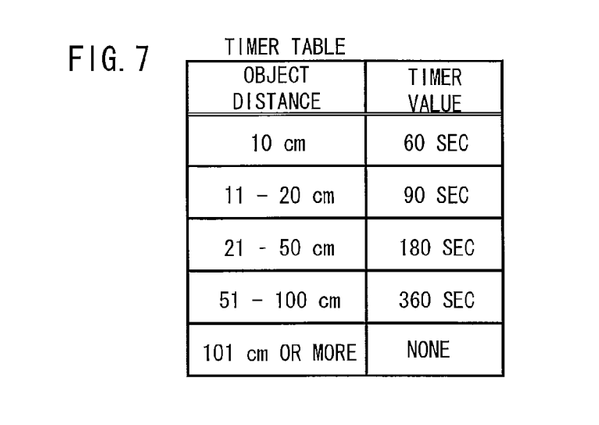
FIG. 7 is an illustrative view showing one example of a configuration of a timer table and an electric power saving table that are stored in a RAM shown in FIG. 1.

FIG. 7 is a timer table storing a timer value corresponding to the object distance. Referring to FIG. 7, if the object distance is "10 cm", for example, the time-out period is set to "60 seconds". Alternatively, if the object distance is "11 to 20 cm", the time-out period is set to "90 seconds", if the object distance is "21 to 50 cm", the time-out period is set to "180 seconds", and if the object distance is "51 to 100 cm", the time-out period is set to "360 seconds". Then, if the object distance is equal to or more than "101 cm", the time-out period is not set.

Here, depending on the kind of the camera module 36, changes in temperature are different, and thus, in another embodiment, the timer values in the timer table may be different. In addition, in this embodiment, the time during which a current is carried through the coil 44 starts to be measured in a case that the object distance is equal to or more than 101 cm. Alternatively in another embodiment, the timer table may be adapted to bring a timer time period into correspondence with a focal length.

Thus, the time-out period can be set depending on the object distance, and therefore, it is possible to prevent the user from encountering a situation in which the focusing operation is suspended as much as possible. For example, in a case that the time-out period is set to a constant value irrespective of the object distance, the time-out period has to be decided in a worst-case condition (in a case that the current value when a current flows through the coil 44 is maximum), resulting a short time-out period. In this case, when a focusing operation is executed by the camera module 36, even if there are much time before the temperature of the camera module 36 reaches the allowable temperature T1, the focusing operation is suspended. Thus, it is assumed that the user frequently encounters the situation in which the focusing operation is suspended during the camera function, resulting in less convenience of the user. However, as in this embodiment, by setting the time-out period depending on the object distance, it is possible to prevent the user from encountering a situation in which the focusing operation is suspended as much as possible.

Here, the camera module 36 has a voice coil motor being a source of generation of heat, and thus, the effect of this embodiment is especially exerted.

Figure 8:
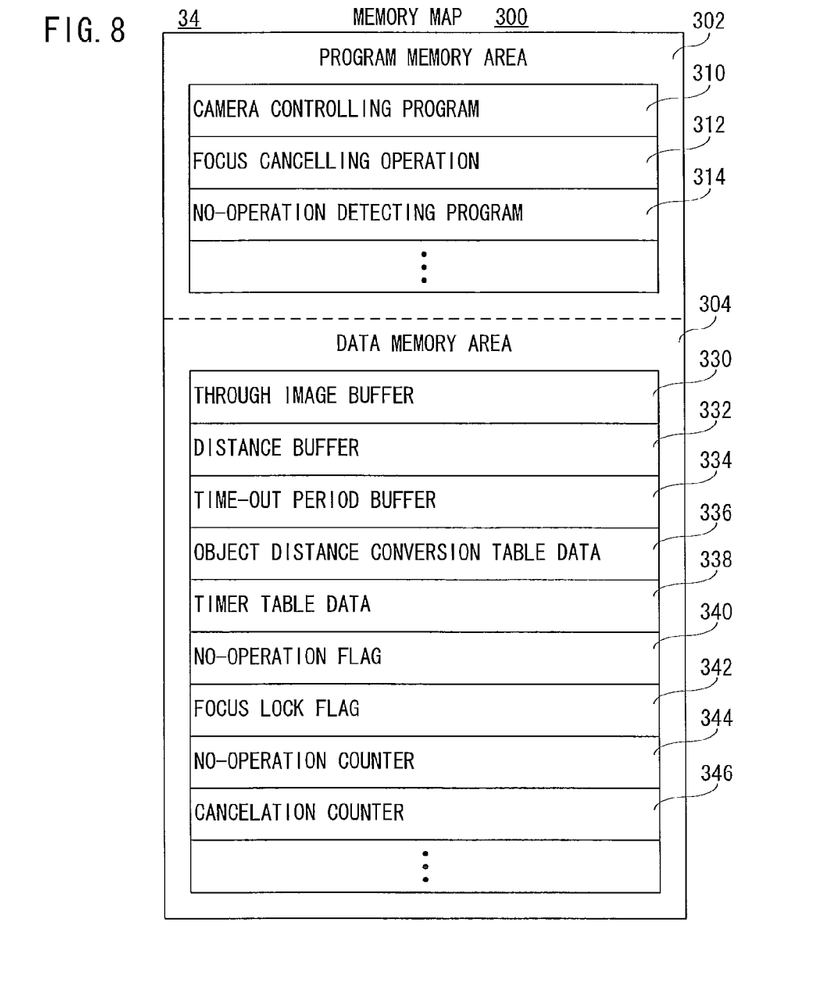
FIG. 8 is an illustrative view showing one example of a memory map of the RAM shown in FIG. 1.

FIG. 8 is an illustrative view showing a memory map 300 of a RAM 34. In the memory map 300 of the RAM 34, a program memory area 302 and a data memory area 304 are included. Additionally, parts of the programs and data are read entirely at a time, or partially and sequentially as required from the flash memory 32 to be stored in the RAM 34, and executed by the processor 24.

In the program memory area 302, a program for operating the mobile phone apparatus 10 is stored. For example, the program for operating the mobile phone apparatus 10 is made up of a camera controlling program 310, a focus cancelling program 312, a no-operation detecting program 314, etc.

The camera controlling program 310 is a program for controlling the camera module 36 to image an image. The focus cancelling program 312 is a program for setting a time-out period and suspending a focusing operation. Furthermore, the no-operation detecting program 314 is a program for detecting a no-operation judgment time (60 seconds, for example), that is, a time during which an input operation is not performed (no operation state) on the key input device 26. Here, in the camera controlling program 310, when the no operation state is detected, the processing is ended.

Although illustration is omitted, a program for operating the mobile phone apparatus 10 includes a program for establishing a speech communication state, and a program for controlling the GUIs displayed on the display 30.

Succeedingly, the data memory area 304 is provided with a through image buffer 330, a distance buffer 332, a time-out period buffer 334, etc. Furthermore, in the data memory area 304, object distance conversion table data 336, timer table data 338, etc. are stored. In addition, in the data memory area 304, a no-operation flag 340, a focus lock flag 342, a no-operation counter 344 and a cancelation counter 346 are further provided.

The through image buffer 330 is a buffer for storing a through-image output by the camera module 36. The distance buffer 332 is a buffer for storing a numerical value of a distance output by the camera module 36 as lens position data. The time-out period buffer 334 is a buffer for temporarily storing a time-out period set by the processing of the focus canceling program 312.

The object distance conversion table data 336 is table data to be utilized for evaluating an object distance based on the lens position data stored in the distance buffer 332. The timer table data 338 is table data of the configuration shown in FIG. 7, and read out when the time-out period is set.

The no-operation flag 340 is a flag for determining whether or not a no-operation state is detected by the processing of the no-operation detecting program 314. For example, the no-operation flag 340 is constructed of one bit register. When the no-operation flag 340 is set to be on (established), for example, a data value "1" is set to the register. On the other hand, if the no-operation flag 340 is turned off (unestablished), a data value "0" is set to the register. This holds true for other flags, and thus, the detailed description of the configuration of the flags is omitted.

The focus lock flag 342 is a flag for determining whether a focus locking state or not. The no-operation counter 344 is a counter for counting a time during which no operation is performed. The cancelation counter 346 is a counter for counting a time during which a current is carried through the coil 44 in a case that the object scene distance is equal to or less than a threshold value.

Although illustration is omitted, the memory area 304 is stored with data for displaying GUIs, and is also provided with counters and flags necessary for an operation of the mobile phone apparatus 10.

Figure 9:
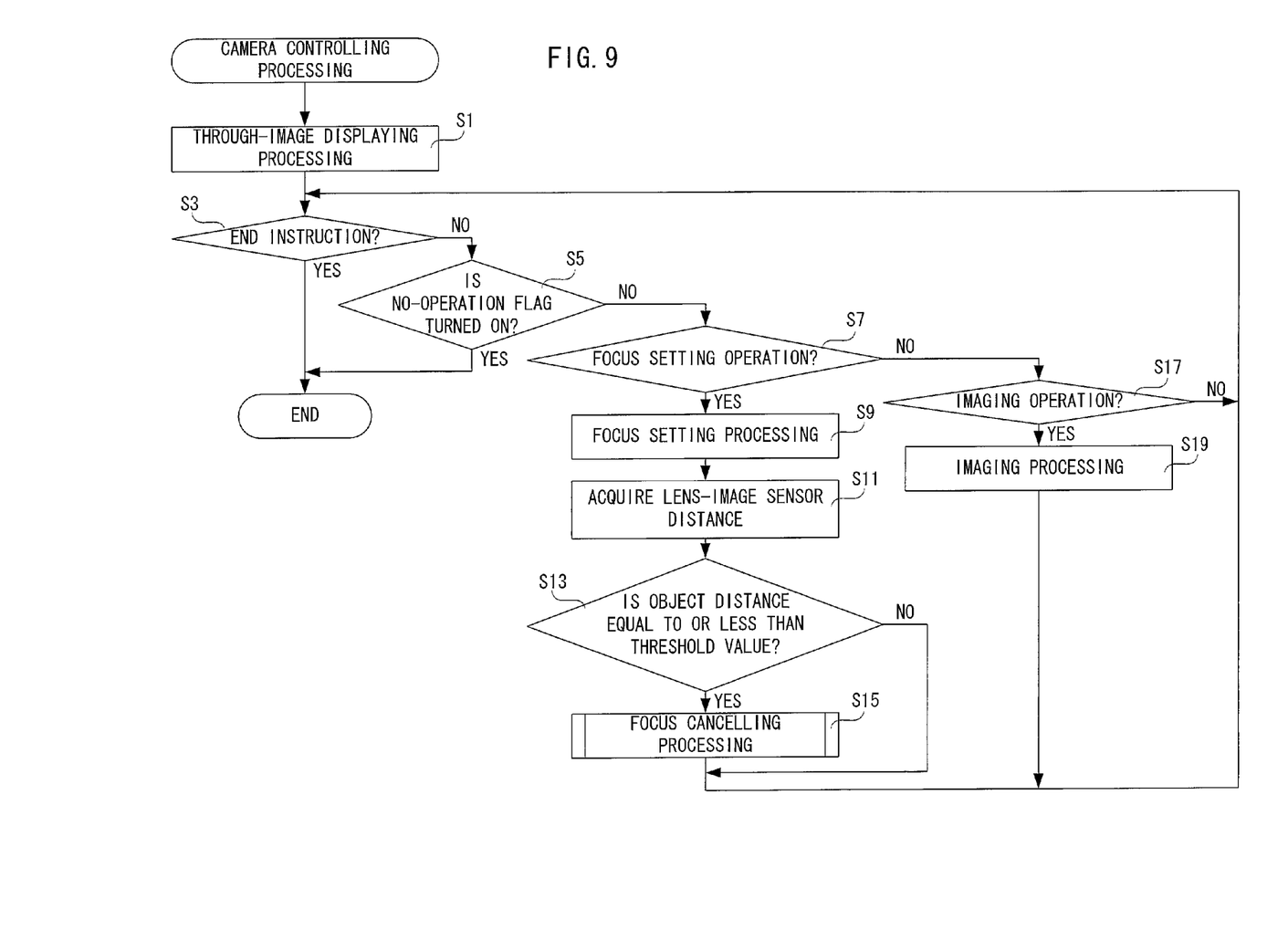
FIG. 9 is a flowchart showing camera controlling processing by a processor shown in FIG. 1.
Figure 10:
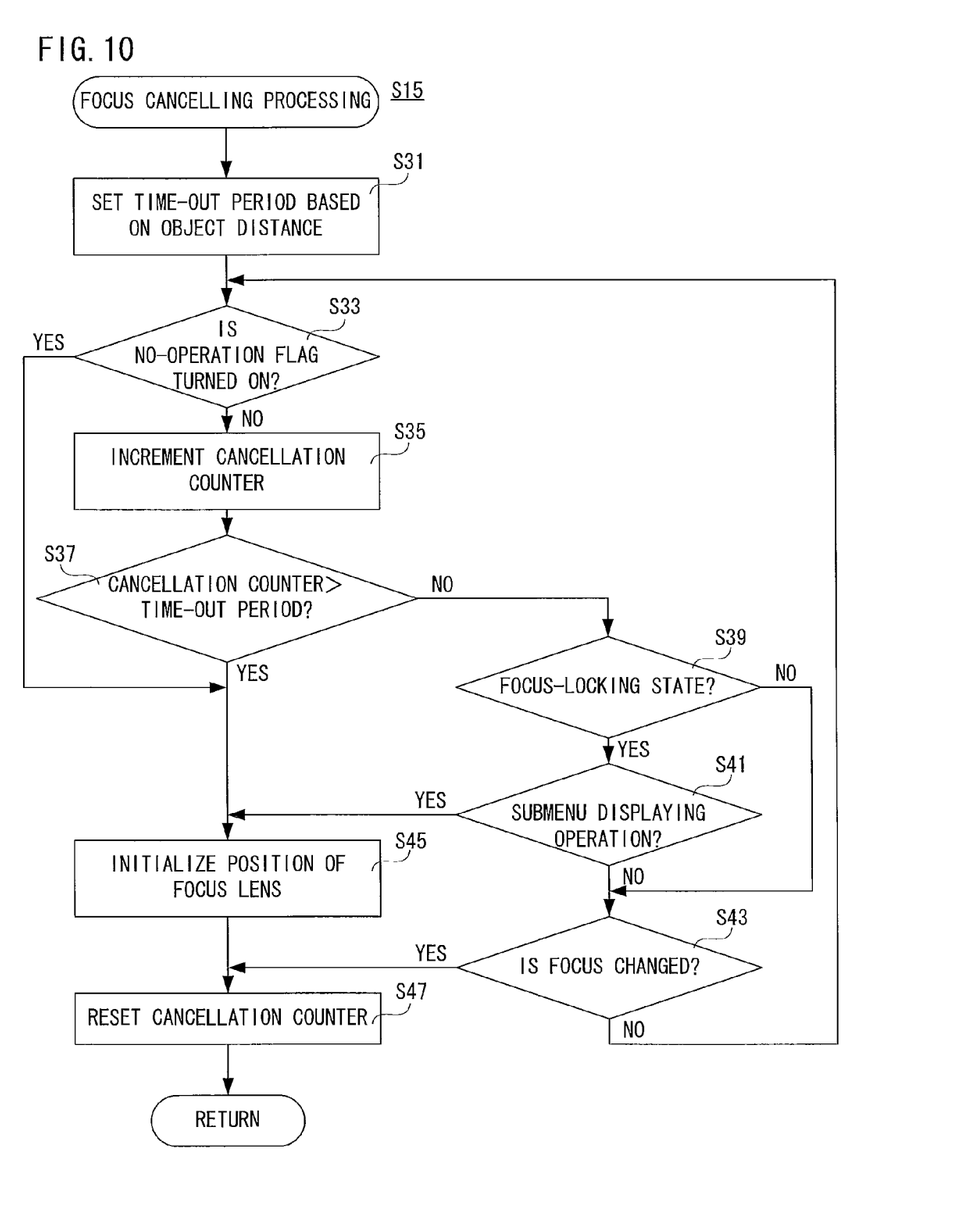
FIG. 10 is a flowchart showing focus cancelling processing by the processor shown in FIG. 1.

The processor 24 performs a plurality of tasks in parallel including camera controlling processing shown in FIG. 9 and focus cancelling processing shown in FIG. 10 under the control of Linux (registered trademark)-based OSes such as Android (registered trademark), REX, etc. and other OSes.

FIG. 9 is a flowchart showing camera controlling processing. For example, when the user performs an input operation of executing the camera function, the processor 24 executes through-image displaying processing in a step S1. That is, the processor 24 issues an instruction to the camera module 36 to thereby display a through-image on the display 30. Succeedingly, in a step S3, it is determined whether or not there is an end instruction. For example, it is determined whether or not a camera function ending operation is performed on the key input device 26. If "YES" in the step S3, that is, if an ending operation is performed, the camera controlling processing is ended. On the other hand, if "NO" in the step S3, that is, if an ending operation is not performed, it is determined whether or not the no-operation flag 340 is turned on in a step S5. That is, the processor 24 determines whether or not a no-operation state is detected by the no-operation flag 340 from the execution of the camera function. If "YES" in the step S5, that is, if a no-operation state is detected from the execution of the camera function, the camera controlling processing is ended. On the other hand, if "NO" in the step S5, that is, if the no-operation flag 340 is turned off, the process proceeds to a step S7.

In the step S7, it is determined whether a focus setting operation or not. That is, it is determined whether or not a setting operation of a macro mode or a distant view mode of the manual focus and an operation of executing autofocus processing are performed on the key input device 26. If "NO" in the step S7, that is, if a focus setting operation is not performed, the process proceeds to a step S17. On the other hand, if "YES" in the step S7, that is, if a focus setting operation is performed, focus setting processing is executed in a step S9. If an operation of setting the macro mode of the manual focus is operated, the camera module 36 is instructed to make the lens-image sensor distance of the focus lens 40 the longest in the step S9. Succeedingly, in a step S11, the lens-image sensor distance is acquired. That is, the numerical value of the lens-image sensor distance output from the camera module 36 is stored as lens position data in the distance buffer 332. Here, the processor 24 executing the processing in the step S11 functions as an acquirer.

Succeedingly, in a step S13, it is determined whether or not the object distance is within a predetermined range, that is, equal to or less than a threshold value. First, in the step S13, the numerical value of the distance included in the lens position data stored in the distance buffer 332 is converted into an object distance on the basis of the object distance conversion table. Then, it is determined whether or not the converted object distance is equal to or less than the threshold value, that is, is equal to or less than 100 cm.

If "NO" in the step S13, that is, if the object distance is larger than the threshold value, the process returns to the step S3. On the other hand, if "YES" in the step S13, that is, if the object distance is equal to or less than the threshold value, focus cancelling processing is executed in a step S15, and the process returns to the step S3. Here, the focus cancelling processing in the step S15 is described in detail by using the flowchart in FIG. 10, and therefore, the description here is omitted.

Furthermore, if a focus setting operation is not performed, it is determined whether or not imaging operation is performed in the step S17. That is, it is determined whether or not an imaging operation is performed on the key input device 26. If "NO" in the step S17, that is, if an imaging operation is not performed, the process returns to the step S3. On the other hand, if "YES" in the step S17, that is, if an imaging operation is performed, imaging processing is executed in a step S19, and the process returns to the step S3. That is, in the step S19, predetermined processing is performed on the image data output from the camera module 36, and an image file including the processed data is stored in the flash memory 32.

FIG. 10 is a flowchart showing focus cancelling processing. The processor 24 sets a time-out period on the basis of the object distance in a step S31 when the processing in the step S15 is executed in the camera controlling processing. If the macro mode of the manual focus is set, for example, the object distance becomes about 10 cm. Therefore, the time-out period is set to "60 seconds" on the basis of the timer table (FIG. 7). Then, the set time-out period is temporarily stored in the time-out period buffer 334. Here, the processor 24 executing the processing in the step S31 functions as a setter.

Succeddingly, in a step S33, it is determined whether or not the no-operation flag 340 is turned on. That is, it is determined whether or not a no-operation state of the mobile phone apparatus 10 is detected. If "YES" in the step S33, if no operation is performed for 60 seconds, for example, the processing after the step S45 is executed to end the focus cancelling processing. Furthermore, when the focus cancelling processing is ended, the processor 24 determines "YES" in the step S5 because the no-operation flag 340 is turned on to thereby end the camera function processing. That is, even during execution of the focus cancelling processing, if the no-operation state is detected, the processor 24 ends the camera controlling processing.

Furthermore, if "NO" in the step S33, that is, if the no-operation flag 340 is turned off, the cancelation counter 346 is incremented in a step S35. That is, the cancelation counter 346 is incremented for counting a time period during which a current flows through the coil 44. Succeedingly, in a step S37, it is determined whether or not the value of the cancelation counter 346 is larger than the time-out period.

For example, the processing in the steps S33 to S43 is repeated every 10 ms or so. Thus, the cancelation counter 346 is counted (incremented) every 10 ms. Accordingly, in a case that the time-out period is 60 seconds, the cancelation counter 346 exceeds a value (6000) corresponding to 60 seconds in the step S37. It should be noted that in another embodiment, timer processing is added so as to repeat the step S33 to S43 every second to thereby use the time-out period as it is. Here, the processor 24 executing the processing in the step S35 and the step S37 functions as a time counter.

If "NO" in the step S37, that is, if a time during which a current flows through the coil 44 does not reach the time-out period, it is determined whether a focus locking state or not in a step S39. That is, it is determined whether or not an operation of setting the focus locking state is performed by the user, and the focus lock flag 342 is turned on. If "NO" in the step S39, that is, if not the focus locking state, the process proceeds to the step S43. On the other hand, if "YES" in the step S39, that is, if the focus locking state, it is determined whether or not a submenu displaying operation is performed in the step S41. For example, it is determined whether or not the second function key 26g is operated in order to display a submenu of the camera function.

If "NO" in the step S41, that is, if the second function key 26g is not operated, it is determined whether or not the focus is changed in the step S43. For example, it is determined whether or not an operation of setting the distant view mode of the manual focus is performed by the user. If "NO" in the step S43, that is, if the focus is not changed, the processing after the step S33 is repeated.

Then, if "YES" is determined in the step S37, that is, if a time during which a current flows through the coil 44 reaches the time-out period, the position of the focus lens 40 is initialized in a step S45. That is, the processor 24 issues an instruction of suspending a current flowing through the coil 44 to the camera module 36 to thereby return the lens position of the focus lens 40 to the initial position. At this time, if the macro mode of the manual focus is set, the distant view mode prevails. Furthermore, if the focus locking state prevails, the focus locking state is canceled. Here, the processor 24 executing the processing in the step S45 functions as a lens adjustment suspender.

Succeedingly, in a step S47, the cancelation counter 346 is reset to end the focus cancelling processing. Then, if the focus cancelling processing is ended, the process returns to the camera controlling processing. That is, in the step S47, since the lens position of the focus lens 40 is changed, the value of the cancelation counter 346 is initialized.

Here, if "YES" in the step S41, that is, if the second function key 26g is operated, for example, it is considered that the user does not intend to continue imaging in the locked state, and the position of the focus lens is initialized in the step S45. That is, it is possible to return the lens position of the focus lens 40 to the initial state without giving the user feel a strange feeling.

Alternatively, if "YES" in the step S43, that is, if the focus is changed, the cancelation counter 346 is reset in the step S47. That is, the lens position of the focus lens 40 is changed, so that the value of the cancelation counter 346 is initialized.

Figure 11:
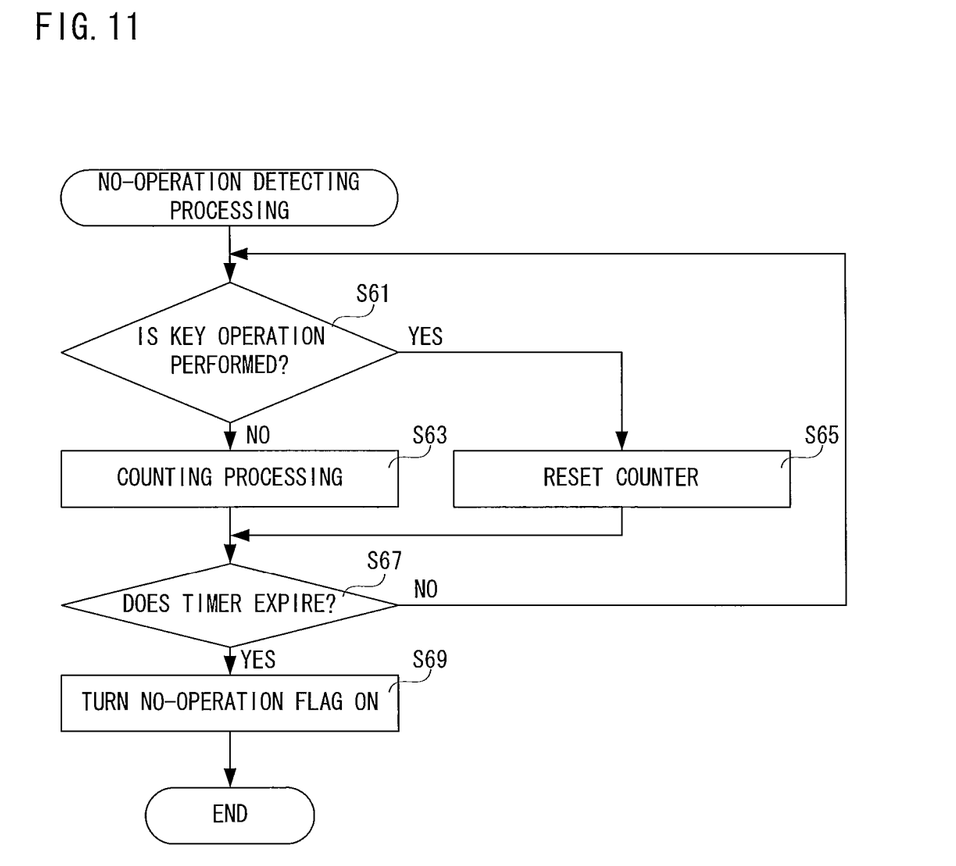
FIG. 11 is a flowchart showing no-operation flag setting processing by the processor shown in FIG. 1.

FIG. 11 is a flowchart showing no-operation flag setting processing. The processor 24 determines whether or not a key operation is performed in a step S61 when the power of the mobile phone apparatus 10 is turned on, and the no-operation flag 340 is turned off (initialized). That is, the processor 24 determines whether or not key data is input from the key input device 26.

If "NO" in the step S61, that is, if a key operation is not performed, counting processing is executed in a step S63, and the process proceeds to a step S67. That is, in the step S63, the no-operation counter 344 is incremented. On the other hand, if "YES" in the step S61, that is, if a key operation is performed, the no-operation counter 344 is reset in a step S65, and the process proceeds to the step S67. That is, in the step S65, the value of the no-operation counter 344 is set to "0".

In the step S67, it is determined whether or not the timer expires. That is, it is determined whether or not the value of the no-operation counter 344 is larger than the threshold value corresponding to the no-operation judgment time (60 seconds, for example). If "NO" in the step S67, that is, if 60 seconds has not elapsed from the key operation, the process returns to the step S61. On the other hand, if "YES" in the step S67, that is, if 60 seconds has elapsed from the key operation, the no-operation flag 340 is turned on in a step S69. That is, the no-operation state of the mobile phone apparatus 10 is detected.

Here, the processing in the steps S61-S67 is repeated every 10 ms or so. Accordingly, the no-operation counter 344 is counted (incremented) every 10 ms. Thus, in a case that the no-operation judgment time is 60 seconds, it is determined whether or not the no-operation counter 344 exceeds the value (6000) corresponding to 60 seconds in the step S67. Here, in another embodiment, by adding stand-by processing so as to perform the processing in the step S61 to S67 every second, the no-operation judgment time can be used as it is.

As understood from the aforementioned description, the mobile phone apparatus 10 has a camera module 36 which increases in temperature by a focusing operation. The processor 24 acquires a lens position coefficient including a numerical value as to a lens position of the focus lens 40. Furthermore, the processor 24 converts the lens-image sensor distance into an object distance, and if the object distance is equal to or less than the threshold value, counting the time is started. Then, the processor 24 suspends the focusing operation by the camera module 36 when the counted time reaches the time-out period.

By suspending the lens adjusting operation based on the operating time, it is possible to take a measure against the temperature with respect to the camera module.

Here, in another embodiment, not by converting the lens-image sensor distance into the object distance, but by measuring the distance by infrared rays and ultrasonic waves, the object distance may be evaluated. For example, in a case that infrared rays are utilized, a window communicating with an infrared communication LED is further provided near the window W (see FIG. 3) communicating with the camera module 36, and by using the infrared communication LED, the distance is calculated. Furthermore, in a case that ultrasonic waves are utilized, an opening communicating with the speaker outputting an incoming call tone and a microphone for IC recording is provided near the window W communicating the camera module 36. Then, ultrasonic waves are irradiated from the speaker and the reflected ultrasonic wave is received by the microphone to thereby measure the distance.

In any case, the distance is measured by the existing components, and therefore, it is possible to measure the distance without adding new components.

Furthermore, the camera module 36 may output data of the current value carried through the coil 44 as a numerical value as to the lens position to the processor 24 in place of the lens-image sensor distance. That is, the current value flowing through the coil 44 is proportional to the lens-image sensor distance, and therefore, similar to the lens-image sensor distance, the lens position of the focus lens 40 can be evaluated with reference to the current value.

Furthermore, the camera function of this embodiment can make an adjustment as to a digital zoom, an exposure correct, a white balance, etc. In addition, by using the camera module 36 including a zoom lens, an optical zoom may be performed.

Additionally, software reading a QR code (registered trademark) and software implementing AR (Augmented Reality) may be executed by using the camera control function.

In addition, as a communication system of the mobile phone apparatus 10, an LIE (Long Term Evolution) system, a W-CDMA system, a GSM system, a TDMA system, an FDMA system and a personal handy-phone system may be adopted without being restricted to the CDMA system. Furthermore, an LCD monitor is used for the display 30, but other kinds of displays such as an organic EL panel, etc. may be utilized. The image sensor 48 of another embodiment is a CMOS image sensor, but in another embodiment, a CCD image sensor may be adopted.

Additionally, the shape of the mobile phone apparatus 10 is a straight type, but a slide type of two casings or a slide type of three casings may be appropriate. In addition, the shape of the mobile phone apparatus 10 may be a single-axis folding type, a by-axial folding type, a revolver type, etc.

Furthermore, the camera controlling program 310 and the focus cancelling program 312 may be stored in an HDD of the server for data delivery, and may be delivered to the mobile phone apparatus 10 via a wireless communication. Furthermore, the memory card may be sold or distributed while storing the camera controlling program 310 and the focus cancelling program 312.

In addition, the present application may be applied to a Smartphone, a PDA (Personal Digital Assistant) and notebook-sized personal computers (including a net book) without being restricted to only the mobile phone apparatus 10.

Then, detailed numeric characters, such as the number of pixels, the distance, the time, and each threshold value that are enumerated in the specification are merely one example, and can be changed as necessary depending on a specification of products.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A camera module integrated with a lens, said camera module executing a lens adjusting operation by adjusting a lens position of said lens, comprising:
    an acquirer which acquires lens position data including a numerical value as to said lens position from said camera module;
    a timer counter which starts to count a time when said lens position data falls within a predetermined range; and
    a lens adjustment suspender which suspends said lens adjusting operation by said camera module when the time counted by said time counter reaches a predetermined time,
    wherein said lens position data is divided into a plurality of sections depending on a magnitude thereof, and said predetermined time is different for each section.

2. A camera module according to claim 1,
    wherein a table, which is stored in a storage, in which a numerical value included in said lens position data corresponding to the section is brought into correspondence with the predetermined time being different from one section to another; and
    said camera module further comprises a setter which sets said predetermined time based on the table stored in said storage when the lens position data is acquired by said acquirer.

3. A camera module according to claim 1, wherein
    said camera module includes a motor, and
    the lens position of said lens changes depending on said motor.

4. A camera module according to claim 1, wherein
    said lens includes a focus lens, and
    said lens adjusting operation includes a focusing operation.

5. A camera module controlling method of a mobile terminal having a camera module integrated with a lens, said camera module executing a lens adjusting operation by adjusting a lens position of said lens, comprising steps of:
    acquiring lens position data including a numerical value as to said lens position from said camera module;
    starting to count a time when said lens position data falls within a predetermined range; and
    suspending said lens adjusting operation by said camera module when the counted time reaches a predetermined time,
    wherein said lens position data is divided into a plurality of sections depending on a magnitude thereof, and said predetermined time is different for each section.

6. A mobile terminal having a camera module integrated with a lens, said camera module executing a lens adjusting operation by adjusting a lens position of said lens, comprising:
    an acquirer which acquires lens position data including a numerical value as to said lens position from said camera module, wherein said lens position data is divided into a plurality of sections depending on a magnitude thereof, and said predetermined time is different for each section;
    a timer counter which starts to count a time when said lens position data falls within a predetermined range; and
    a lens adjustment suspender which suspends said lens adjusting operation by said camera module when the time counted by said time counter reaches a predetermined time.

7. A mobile terminal according to claim 6, further comprising:
    a storage which stores a table in which a numerical value included in said lens position data corresponding to the section is brought into correspondence with the predetermined time being different from one section to another; and
    a setter which sets said predetermined time based on the table stored in said storage when the lens position data is acquired by said acquirer.

8. A mobile terminal according to claim 6, wherein said camera module includes a motor, and
    the lens position of said lens changes depending on said motor.

9. A mobile terminal according to claim 6, wherein said lens includes a focus lens, and
    said lens adjusting operation includes a focusing operation.

* * * * *